(12) United States Patent
Thubert et al.

(10) Patent No.: US 12,218,908 B2
(45) Date of Patent: Feb. 4, 2025

(54) SECURED ADVERTISEMENT OF AUTOCONFIGURED INTERNET PROTOCOL PREFIXES IN A CLOUD ENVIRONMENT

(71) Applicant: Cisco Technology, Inc., San Jose, CA (US)

(72) Inventors: Pascal Thubert, Roquefort les Pins (FR); Jerome Tollet, Paris (FR); Ali Sajassi, San Ramon, CA (US); Aloÿs Christophe Augustin, Versailles (FR); Nathan Roland Maryan Skrzypczak, Paris (FR); Stephane Litkowski, Liffre (FR)

(73) Assignee: Cisco Technology, Inc., San Jose, CA (US)

( * ) Notice: Subject to any disclaimer, the term of this patent is extended or adjusted under 35 U.S.C. 154(b) by 86 days.

(21) Appl. No.: 17/677,599

(22) Filed: Feb. 22, 2022

(65) Prior Publication Data
US 2023/0269223 A1   Aug. 24, 2023

(51) Int. Cl.
G06F 15/16 (2006.01)
G06F 9/54 (2006.01)
H04L 29/06 (2006.01)
H04L 61/5061 (2022.01)
H04L 61/5092 (2022.01)
H04L 101/686 (2022.01)

(52) U.S. Cl.
CPC ...... H04L 61/5092 (2022.05); H04L 61/5061 (2022.05); *H04L 2101/686* (2022.05)

(58) Field of Classification Search
CPC ............. H04L 61/5061; H04L 61/5092; H04L 2101/686
USPC ....................................................... 706/245
See application file for complete search history.

(56) References Cited

U.S. PATENT DOCUMENTS

| 6,058,431 A * | 5/2000 | Srisuresh ................ H04L 61/00 709/225 |
| 8,681,695 B1 * | 3/2014 | Krishnan ............ H04L 61/5014 370/395.54 |
| 10,693,715 B1 | 6/2020 | Strauss et al. |
| 2007/0255812 A1 * | 11/2007 | Mirtorabi ................ H04L 45/02 709/220 |

(Continued)

OTHER PUBLICATIONS

International Search Report and Written Opinion for PCT application No. PCT/US2020/062933, mailed on May 11, 2023, 12 pages.

*Primary Examiner* — Hamza N Algibhah
(74) *Attorney, Agent, or Firm* — Polsinelli P.C.

(57) ABSTRACT

Systems, methods, and computer-readable media are provided for securely advertising autoconfigured prefixes in a cloud environment. In some examples, a method can include, receiving, by a first router, an indication of an available network address prefix. In some aspects, the method can also include selecting, by the first router, a first network address prefix that is within the available network address prefix, wherein the first network address prefix provides at least one route to one or more network elements associated with the first router. In some cases, the method may further include sending, to a second router, a message including a stub registration option that indicates the first network address prefix.

18 Claims, 7 Drawing Sheets

(56) References Cited

U.S. PATENT DOCUMENTS

| | | | | |
|---|---|---|---|---|
| 2008/0263353 | A1* | 10/2008 | Droms | H04L 63/0428 713/153 |
| 2009/0073993 | A1* | 3/2009 | Qureshi | H04L 45/04 370/401 |
| 2009/0073994 | A1* | 3/2009 | Qureshi | H04L 45/46 370/401 |
| 2009/0238188 | A1* | 9/2009 | Xu | H04L 45/04 370/392 |
| 2009/0257439 | A1* | 10/2009 | Xu | H04L 45/033 370/389 |
| 2011/0004674 | A1* | 1/2011 | Zheng | H04L 61/5046 709/220 |
| 2011/0182295 | A1* | 7/2011 | Singh | H04L 41/0803 370/401 |
| 2011/0258343 | A1* | 10/2011 | Kettunen | H04L 61/5061 709/245 |
| 2011/0317711 | A1 | 12/2011 | Droms et al. | |
| 2012/0314705 | A1* | 12/2012 | Howard | H04L 45/00 370/390 |
| 2013/0111065 | A1* | 5/2013 | Donley | H04L 61/4511 709/245 |
| 2013/0155845 | A1* | 6/2013 | Patel | H04L 45/04 370/225 |
| 2014/0010117 | A1* | 1/2014 | Lindem, III | H04L 45/12 370/255 |
| 2014/0215087 | A1 | 7/2014 | Zhao et al. | |
| 2014/0297875 | A1* | 10/2014 | Cheng | H04L 61/5084 709/226 |
| 2015/0052234 | A1* | 2/2015 | Hahn | H04L 49/15 709/223 |
| 2015/0180823 | A1 | 6/2015 | Zheng et al. | |
| 2015/0263932 | A1* | 9/2015 | Chunduri | H04L 45/12 370/389 |
| 2015/0271059 | A1* | 9/2015 | Chunduri | H04L 45/748 370/400 |
| 2016/0248663 | A1* | 8/2016 | Patel | H04L 45/24 |
| 2017/0012873 | A1* | 1/2017 | Berg | H04L 61/251 |
| 2019/0141614 | A1* | 5/2019 | Wang | H04W 8/005 |
| 2019/0342215 | A1* | 11/2019 | Jain | H04L 45/742 |
| 2020/0259733 | A1* | 8/2020 | Raj | H04L 45/22 |
| 2020/0314059 | A1* | 10/2020 | Luo | H04L 61/5007 |
| 2020/0412686 | A1* | 12/2020 | Schomp | H04L 61/5007 |
| 2021/0314240 | A1 | 10/2021 | Liu et al. | |
| 2022/0045983 | A1* | 2/2022 | Carter | H04L 12/2829 |
| 2022/0109605 | A1* | 4/2022 | Doshi | G06F 8/60 |
| 2022/0141181 | A1* | 5/2022 | Jain | H04L 41/0894 726/13 |
| 2022/0417737 | A1* | 12/2022 | Zhang | H04L 45/74 |
| 2023/0105744 | A1* | 4/2023 | Lin | H04L 12/4641 370/392 |

* cited by examiner

SECURED ADVERTISEMENT OF AUTOCONFIGURED INTERNET PROTOCOL PREFIXES IN A CLOUD ENVIRONMENT

TECHNICAL FIELD

The subject matter of this disclosure relates in general to the field of computer networking, and more particularly, to systems and methods for securely advertising autoconfigured prefixes in a cloud environment.

BACKGROUND

Cloud computing generally refers to the use of computing resources (e.g., hardware and software) that are delivered as a service over a network such as the Internet. Distributed applications can generally be delivered using cloud computing techniques. For example, distributed applications can be provided using a cloud computing model, in which users are provided access to application software and/or databases over a network. The cloud providers (e.g., an internet service provider (ISP)) generally manage the infrastructure on which the applications run. For example, Kubernetes™ provides a cloud-native solution that facilitates the automated deployment, scaling, and management of containerized applications (e.g., software applications).

In some cases, configuring cloud-based applications requires manual configuration of one or more Internet Protocol (IP) addresses. Furthermore, the IP addresses associated with cloud-based applications are assigned to the applications (e.g., by an Internet Protocol Address Management (IPAM) server). Thus, it would be advantageous to implement a cloud computing environment in which a node may autoconfigure a range of IP addresses (e.g., IP prefix) and securely advertise the IP prefix to other nodes in the cloud computing environment.

BRIEF DESCRIPTION OF THE DRAWINGS

In order to describe the manner in which the various advantages and features of the disclosure can be obtained, a more detailed description will be rendered by reference to specific embodiments which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

OVERVIEW

Disclosed herein are systems, methods, and computer-readable media for securely advertising autoconfigured prefixes in a cloud environment. According to at least one example, a method for autoconfiguring and advertising an internet protocol (IP) prefix is provided. The method can include: receiving, by a first router, an indication of an available network address prefix; selecting, by the first router, a first network address prefix that is within the available network address prefix, wherein the first network address prefix provides at least one route to one or more network elements associated with the first router; and sending, to a second router, a message including a stub registration option that indicates the first network address prefix.

According to at least one example, an apparatus is provided that includes one or more processors and at least one computer-readable storage medium having stored thereon instructions which, when executed by the one or more processors, cause the apparatus to: receive an indication of an available network address prefix; select a first network address prefix that is within the available network address prefix, wherein the first network address prefix provides at least one route to one or more network elements associated with the apparatus; and send, to a router, a message including a stub registration option that indicates the first network address prefix.

According to at least one example, a non-transitory computer-readable storage medium is provided. The non-transitory computer-readable storage medium can store instructions which, when executed by one or more processors, cause the one or more processors to receive, by a first router, an indication of an available network address prefix; select a first network address prefix that is within the available network address prefix, wherein the first network address prefix provides at least one route to one or more network elements associated with the first router; and send, to a second router, a message including a stub registration option that indicates the first network address prefix.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

EXAMPLE EMBODIMENTS

Cloud computing aggregates physical and virtual compute, storage, and network resources in the "cloud", and allows users to utilize the aggregated resources. For example, distributed applications can be provided using a cloud computing model, in which users are provided access to application software and/or databases over a network. The cloud providers (e.g., an internet service provider (ISP)) generally manage the infrastructure on which the applications run.

In some cases, a virtual node (e.g., virtual machines (VMs), software containers, etc.) in a cloud computing environment may peer with a network (e.g., network fabric) by injecting routes using border gateway protocol (BGP) or secure BGP (S-BGP). However, in some cases, BGP may lack security as a tenant may be able to impersonate another tenant to transmit or receive using its Internet Protocol (IP) prefixes. In some examples, S-BGP may address the security concerns present with BGP but can result in significant operational expenses each time an IP prefix is installed.

The present technology provides systems and techniques for auto-configuring an IP address prefix in a cloud computing environment and for securely advertising the IP address prefix in the cloud environment. In some aspects, a virtual router may receive a range of available IP addresses. For example, a virtual router (e.g., a stub router in a Kubernetes node) may receive an IPv6 prefix from an Internet Protocol Address Management (IPAM) server. In some examples, the router can select or claim a subset of IP addresses that are within the available IP addresses. In some cases, the subset of IP addresses can correspond to the entire range of available IP addresses (e.g., the router can select the entire IPv6 prefix).

In some aspects, the router can register the selected prefix or address range by sending a message to a border router (e.g., a top of rack switch, a nexus switch, etc.) that provides access to a network fabric. In some examples, the message can correspond to a router solicitation message. In some cases, the router solicitation message can include a stub registration option that can be used to indicate the claim prefix and/or length. In some examples, the stub registration option can also include one or more parameters associated with the claimed prefix. For instance, the one or more parameters in the stub registration option can be used to indicate whether the selected prefix is atomic (e.g., a host route with no fine subnets). In another example, the one or more parameters in the stub registration option can be used to indicate whether the prefix is used to embed IPv4 addresses. In another case, the one or more parameters in the stub registration option can be used to indicate whether the prefix is multihomed. In another case, the one or more parameters in the stub registration option can include load balancing parameters (e.g., based on access bandwidth, number of works in subnet, etc.).

In some cases, the border router can receive the router solicitation message that includes the selected prefix. In some examples, the border router can determine whether the selected prefix is within the range of available IP addresses. If the prefix is outside of the range of available IP addresses, the border router can deny the request to for the selected prefix. In some aspects, if the prefix is within the range of the available IP addresses, the border router can inject the route or routes into a network fabric (e.g., datacenter fabric).

In some cases, the border router may also register the claimed IP address prefix to an abstract central authority (e.g., a controller, a distributed protocol such as BGP, a location identifier separation protocol (LISP) map server (MS), a LISP map resolver (MR), etc.). In some aspects, registration of the IP address prefix can include a proof of ownership token. In some examples, the proof of ownership token can be used to authenticate ownership of the IP address prefix for registration, advertisement, re-advertisement, withdrawal, etc.

Figure 1:
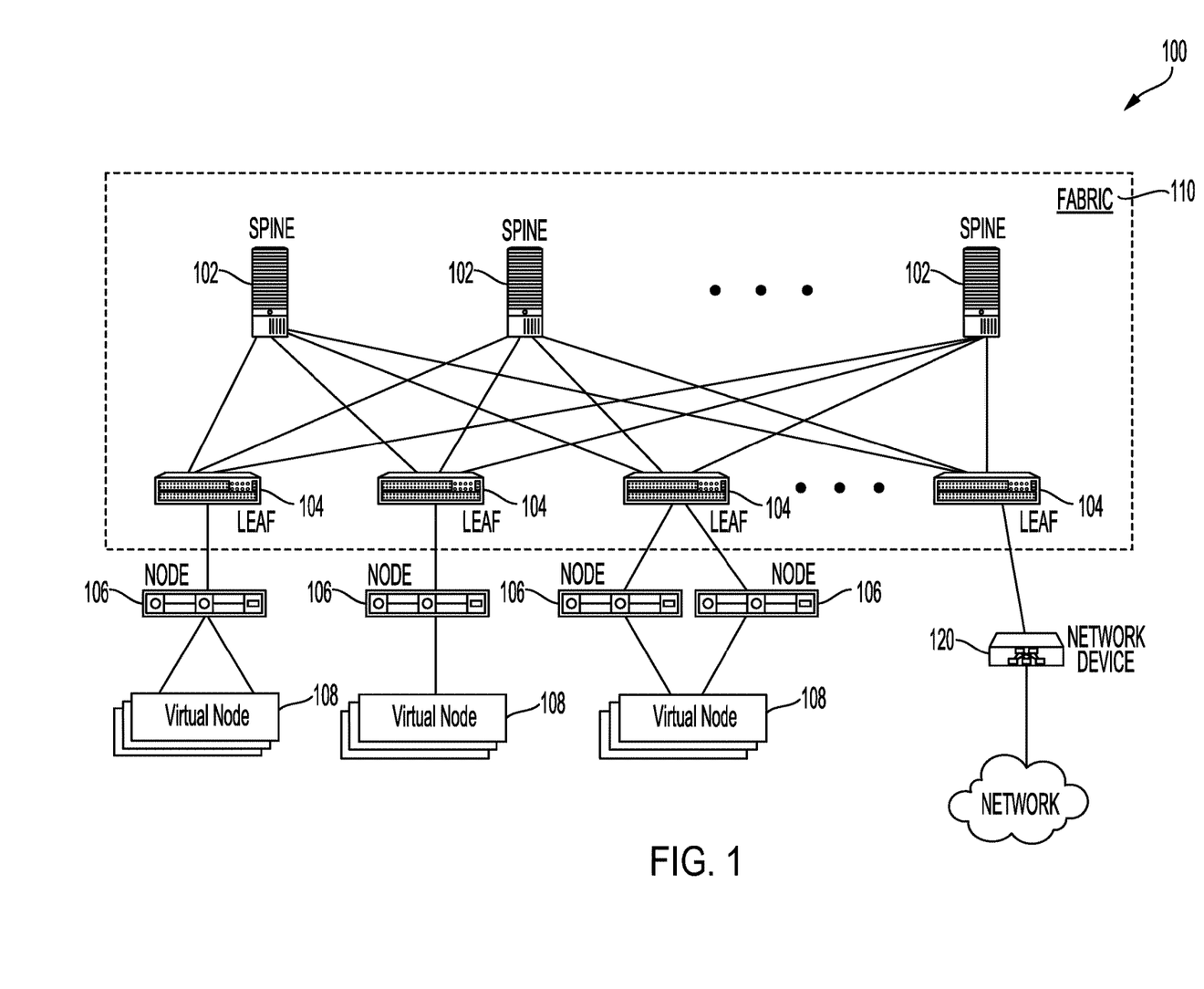
FIG. 1 is a block diagram illustrating an example network architecture, in accordance with some examples.

FIG. 1 is a block diagram illustrating an example network architecture 100, in accordance with some examples. In some aspects, the network architecture 100 can include a network fabric 110. The network fabric 110 can include and/or represent the physical layer or infrastructure (e.g., underlay) of the network architecture 100. For example, in some cases, the network fabric 110 can represent a data center(s) of one or more networks such as, for example, one or more cloud networks. In this example architecture, the fabric 110 can include spine nodes 102 (e.g., spine switches or routers) and leaf nodes 104 (e.g., leaf switches or routers), which can be interconnected to route or switch traffic in the fabric 110.

The spine nodes 102 can interconnect with the leaf nodes 104 in the fabric 110, and the leaf nodes 104 can connect the fabric 110 to an external network(s), a network overlay(s) and/or logical portion(s) of the network. In some cases, the network overlay(s) and/or logical portion(s) of the network can include, for example, application services, servers, virtual machines, software containers, virtual resources (e.g., storage, memory, CPU, network interfaces, applications, execution environments, etc.), virtual networks, etc.

Network connectivity in the fabric 110 can flow from the spine nodes 102 to the leaf nodes 104, and vice versa. In some cases, the interconnections between the leaf nodes 104 and the spine nodes 102 can be redundant (e.g., multiple interconnections) to avoid a failure in routing. In some examples, the leaf nodes 104 and the spine nodes 102 can be fully connected, such that any given leaf node is connected to each of the spine nodes 102, and any given spine node is connected to each of the leaf nodes 104. Other interconnections between the leaf nodes 104 and the spine nodes 102 are also possible and contemplated herein.

In some cases, the leaf nodes 104 can be, for example, top-of-rack ("ToR") switches, aggregation switches, gateways, ingress and/or egress switches, provider edge devices, and/or any other type of routing or switching device. The leaf nodes 104 can route and/or bridge client/tenant/customer packets to and from other elements, as further described below. In some cases, the leaf nodes 104 can apply network policies or rules to packets. The leaf nodes 104 can connect other elements to the fabric 110. For example, the leaf nodes 104 can connect the server nodes 106, virtual nodes 108 (e.g., virtual machines (VMs), software containers, etc.), network device 120, etc., with the fabric 110. In some examples, one or more of such elements can reside in one or more logical or virtual layers or networks, such as an overlay network. In some cases, the leaf nodes 104 can encapsulate and decapsulate packets to and from such elements in order to enable communications throughout network architecture 100 and/or the fabric 110. The leaf nodes 104 can also provide any other devices, services, tenants, or workloads access to the fabric 110.

In some cases, the server nodes 106 connected to the leaf nodes 104 can encapsulate and decapsulate packets to and from the leaf nodes 104. For example, the server nodes 106 can include one or more virtual switches, routers tunnel endpoints, etc., for tunneling packets between an overlay or logical layer hosted by, or connected to, the server nodes 106 and an underlay layer represented by or included in the fabric 110 and accessed via the leaf nodes 104. The server nodes 106 can include, for example, computing devices, such as physical servers, network devices (e.g., switches, routers, etc.), storage devices, and the like. Moreover, the server nodes 106 can host virtual nodes 108 as further described herein.

In some cases, some or all of the virtual nodes 108 can include software containers, virtual machines, software applications, services, appliances, functions, service chains, etc. For example, one or more of the virtual nodes 108 can include a software container providing an execution environment, a storage service, a firewall service, a message router, a virtual switch, and/or any other application service. One or more applications can be hosted or implemented by one or more software containers corresponding to one or more of the virtual nodes 108 or can be distributed, chained, etc. In some cases, some or all of the virtual nodes 108 can include virtual machines (VMs). VMs can include workloads running on a guest operating system on a respective node. In some cases, a VM (e.g., 108) on a server node (e.g., 106) can be migrated to a different server node (e.g., 106).

In some cases, one or more server nodes 106 and/or virtual nodes 108 can represent or reside in one or more tenant or customer spaces. A tenant or customer space can include workloads, services, applications, devices, networks, networks or routing domains (e.g., virtual routing and forwarding (VRF) domains, bridge domains (BDs), subnets, virtual networks, etc.) and/or resources associated with one or more clients or subscribers. In some examples, traffic in the network architecture 100 can be routed based on specific tenant policies, agreements, configurations, etc. In some cases, addressing can vary between tenants. In some examples, tenant spaces can be divided into logical segments and/or networks and separated from logical segments and/or networks associated with other tenants.

Configurations in the network architecture 100 can be implemented at a logical level, a hardware level (e.g., physical), and/or both. For example, configurations can be implemented at a logical and/or hardware level based on connection attributes, endpoint or resource attributes, etc., such as endpoint types and/or application groups or profiles. In some examples, configurations can be implemented through a software-defined network (SDN), underlay framework and/or overlay framework. Such configurations can define rules, policies, priorities, protocols, attributes, objects, profiles, groups, traffic, security parameters, etc., for routing, processing, and/or classifying traffic in the network architecture 100. For example, configurations can define attributes and objects for classifying and processing traffic based on endpoint groups (EPGs), security groups (SGs), VM types, BDs, VRFs, tenants, priorities, firewall rules, labels, addresses, etc.

The network architecture 100 can deploy different resources (e.g., hosts, applications, services, functions, etc.) via the leaf nodes 104, the server nodes 106, the virtual nodes 108, and/or any other device. The network architecture 100 can interoperate with a variety of server nodes 106 (e.g., physical and/or virtual servers), orchestration platforms, systems, etc. In some cases, the network architecture 100 can implement and/or can be part of one or more cloud networks and can provide cloud computing services such as, for example, cloud storage, software-as-a-service (SaaS) (e.g., collaboration services, email services, enterprise resource planning services, content services, communication services, etc.), infrastructure-as-a-service (IaaS) (e.g., security services, networking services, systems management services, etc.), platform-as-a-service (PaaS) (e.g., web services, streaming services, application development services, etc.), function-as-a-service (FaaS), and/or any other types of services such as desktop-as-a-service (DaaS), information technology management-as-a-service (ITaaS), managed software-as-a-service (MSaaS), mobile backend-as-a-service (MBaaS), etc. In some examples, the network architecture 100 can implement and/or host a serverless computing environment(s), as further described below.

The network architecture 100 described above illustrates a non-limiting example network environment and architecture provided herein for explanation purposes. It should be noted that other network environments and architectures can be implemented in other examples and are also contemplated herein. One of ordinary skill in the art will recognize in view of the disclosure that the technologies and approaches herein can apply to a variety of different network environments and architectures.

Figure 2:
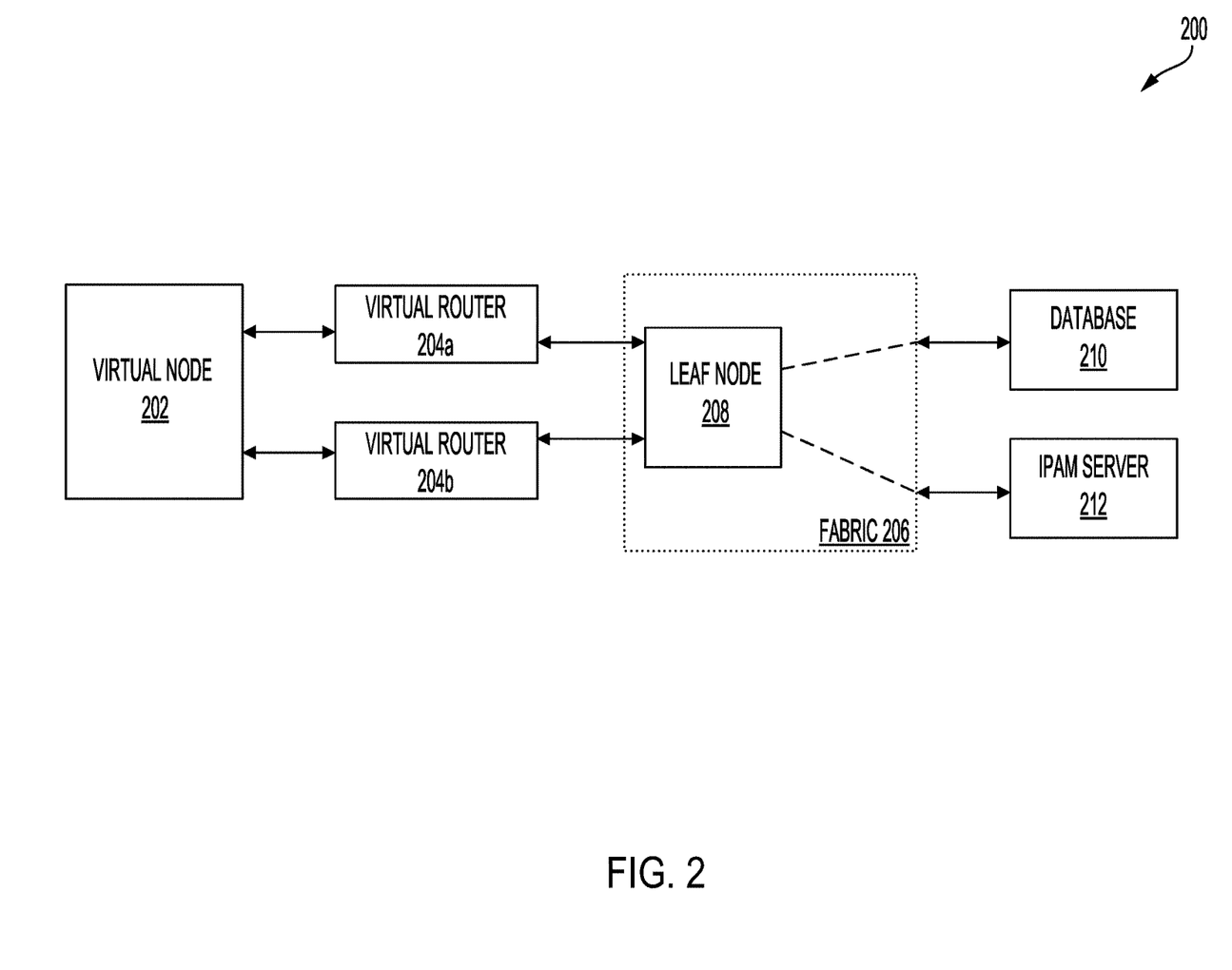
FIG. 2 is a block diagram illustrating an example system for securely advertising autoconfigured prefixes in a cloud environment, in accordance with some examples.

FIG. 2 is a block diagram illustrating an example network 200. In some aspects, the network 200 can include virtual node 202. In some cases, virtual node 202 may include software containers, virtual machines, software applications, services, appliances, functions, service chains, etc. In one illustrative example, virtual node 202 may correspond to a Kubernetes™ container that can include one or more software applications that can be executed in a cloud environment. In some examples, a container (e.g., virtual node 202) may store code, files, libraries, environment variables, etc. that can be used to run software independent of a particular platform.

In some examples, network 200 may also include one or more virtual routers such as virtual router 204a and virtual router 204b. In some cases, virtual router 204a and/or virtual router 204b may be part of a container network interface (CNI) that is associated with virtual node 202. For example, virtual router 204a and/or virtual router 204b can implement a cloud native CNI and internet protocol (IP) address management (IPAM) functions. Example CNI implementations can include Calico™ and Cilium.

In some aspects, virtual router 204a and/or virtual router 204b can provide network connectivity for virtual node 202 by interfacing with leaf node 208 within fabric 206. As discussed with respect to FIG. 1, fabric 206 can include spine nodes (not illustrated) and leaf nodes (e.g., leaf node 208), which can be interconnected to route or switch traffic in the fabric 206.

In some cases, network 200 may include a database 212. In some cases, database 212 may correspond to a central database such as a Location Identifier Separation Protocol (LISP) database. For instance, database 212 may include a map server (MS) that can configure LISP site policy to authenticate when LISP sites try to register to the MS and provide an interface to an ALT router (e.g., router running external border gateway protocol (eBGP)). In some cases, database 212 may include a map resolver (MR) that can receive map requests and also interface with an ALT router.

In some examples, database 212 may correspond to a distributed database. For example, database 212 may include an ethernet virtual private network (eVPN) database. In another example, database 212 may include a border gateway protocol (BGP) routing table. In some aspects, database 212 may implement load balancing domain name system (DNS) functions. In some configurations, database 212 may communicate with virtual node 202 (e.g., via virtual router 204a and/or virtual router 204b and fabric 206).

In some instances, network 200 may include an internet protocol (IP) address management (IPAM) server 212. In some examples, IPAM server 212 may correspond to a centralized IPAM server. In some cases, IPAM server 212 may include multiple IPAM servers implementing a distributed IPAM. In some configurations, IPAM server 212 may communicate with virtual node 202 (e.g., via virtual router 204a and/or virtual router 204b and fabric 206).

In some aspects, IPAM server 212 may receive a request for an IP address prefix from virtual router 204a and/or virtual router 204b. In some cases, the IP address prefix may correspond to an IPv4 address prefix. For example, IPAM server 212 may provision an IPv4 tenant-global subnet (e.g., subnet 10.1.0.0/28). In some examples, the IP address prefix may correspond to an IPv6 address prefix. In one illustrative example, IPAM server 212 may provision IPv6 prefix 2001:db8:1::/96 for subnet 10.1.0.0/28 in tenant virtual routing and forwarding (VRF). In some cases, IPAM server 212 may provision an IP address prefix using dynamic host configuration protocol prefix delegation (DHCP-PD).

In some examples, IPAM server 212 may also provide a sequence counter and/or a key pair that are associated with the IP address prefix. As discussed further herein, in some cases, virtual router 204a and/or virtual router 204b may use the sequence counter and/or the key pair to perform authentication with regard to an IP address prefix. In some aspects, virtual router 204a and/or virtual router 204b may generate the sequence counter and/or the key pair (e.g., virtual router 204a may generate a sequence counter and/or key pair for short lived and owned prefixes).

In some instances, virtual router 204a and/or virtual router 204b may receive the IP address prefix from IPAM server 212 and may autoconfigure a prefix of any size within the IP address prefix. In some cases, virtual router 204a and/or virtual router 204b may configure the IP address prefix as an atomic prefix such that the prefix may not include any subnets (e.g., no host route within the prefix). In some aspects, virtual router 204a and/or virtual router 204b may configure the IP address prefix for IPv4 embedding. In one illustrative example, virtual router 204a may provision an IPv6 address prefix of /96 and use it to embed IPv4 addresses (e.g., an IP address within an IP address to implement IPv6 without encapsulation). In some examples, virtual router 204a and/or virtual router 204b may split IPv4 addresses into 2 or more ranges (e.g., a cluster local address range, a tenant global address range, etc.). In some instances, virtual router 204a and/or virtual router 204b may configure the IP address prefix for multihoming virtual node 202 (e.g., virtual router 204a and virtual router 204b can provide multihoming to virtual node 202).

In some aspects, virtual router 204a and/or virtual router 204b can register the autoconfigured IP address prefix by sending a message to leaf node 208. In some cases, the message can correspond to a router solicitation (RS) message. In some aspects relating to a multihomed virtual node 202, a single virtual router (e.g., 204a or 204b) may handle communication with leaf node 208. In some examples, the RS message can include one or more parameters or options. In some instances, the RS message can include a stub registration option (SRO) that can be used to provide an indication of a claimed IP address prefix and/or length. In some configurations, the RS message can include a flag (e.g., an 'R' flag) that can be used to request reachability services for the IP address prefix (e.g., request leaf node 208 to inject route or routes into fabric 206).

In some examples, the RS message can include an option or parameter to indicate whether the IP address prefix is atomic (e.g., no finer subnet or host route). In some aspects, the RS message can include an option or parameter to indicate whether the IP address prefix is being used for IPv4 address embedding. In some cases, the RS message can include an option or parameter to indicate whether the IP address prefix corresponds to a multihomed virtual node 202 (e.g., multiple routes will be injected corresponding to virtual router 204a and virtual router 204b). In some aspects, the RS message may include an option or parameter to indicate proof of ownership. For instance, the RS message may include a sequence counter and/or a key pair that can be associated with the IP address prefix and used to authenticate ownership of the IP address prefix.

In some aspects, the RS message can include an option or parameter that indicates a policy associated with the IP address prefix. For example, the RS message can include a policy for configuring an access control list (ACL). In some cases, the RS message can include a parameter to signal partial micro-segmentation of the IP address prefix. In some examples, the RS message can include options or parameters associated with load balancing. For instance, the RS message can signal worker capacity metrics or access bandwidth for a cluster or a container. In another example, the RS message can signal multihoming metrics (e.g., preferred interface, anycast support, etc.).

In some examples, leaf node 208 (e.g., top-of-rack (ToR) switch) can receive and process the RS message for registering the IP address prefix. In some cases, leaf node 208 can determine whether the requested IP address prefix is within the available IP address prefix identified by IPAM server 212 (e.g., leaf node 208 can determine whether requested IP address prefix results in collision). If the requested IP address prefix is not within the available IP address prefix, the request from virtual router 204a and/or virtual router 204b can be rejected.

In some cases, leaf node 208 can register the IP address prefix with a central or a distributed database (e.g., database 210). In some examples, leaf node 208 may send an Extended Duplicate Prefix Request (EDPR) to database 210. In some aspects, the EDPR message can be used to register the IP address prefix with database 210. In some examples, the EDPR message can be used to register the prefix for IPv4 addresses as subnets. In some cases, database 210 may determine whether the aggregation immediately above the registered prefix in the registrar is registered as atomic. In some examples, database 210 may deny the request to register the IP address prefix upon determining that another network entity may have claimed aggregation that encompasses the requested IP address prefix for atomic usage, which may disrupt operation of the other prefix. In some cases, database 210 may deny the request to register an atomic IP address prefix upon determining that a smaller aggregation or a host route is already registered within the atomic IP address prefix that is requested, which may disrupt operation of the smaller aggregation. In some instances, registration of a non-atomic IP address prefix is performed prior to advertising a smaller aggregation or host route within the non-atomic IP address prefix. In some aspects, database 210 can respond to leaf node 208 using an Extended Duplicate Prefix Confirm (EDPC) message.

In some instances, leaf node 208 may receive an EDPC message from database 210 indicating that the IP address prefix has been registered. In some cases, registration of the IP address prefix may be associated with one or more parameters for authentication and/or proof of ownership. For example, registration of an IP address prefix may include an association with a key pair, sequence counter, ownership token, etc. that can be used to validate virtual router 204a and/or virtual router 204b as the owner of the IP address prefix. In some examples, leaf node 208 may send a router advertisement (RA) message to advertise the IP address prefix to fabric 206 (e.g., using interior gateway protocol (IGP), ethernet virtual private network (eVPN) protocol, and/or using any other suitable protocol).

In some cases, virtual router 204a or virtual router 204b (e.g., single router may handle multihomed virtual node 202) may send a message to leaf node 208 requesting reinjection (e.g., new advertisement) or withdrawal of an IP address prefix. In some examples, the message may correspond to a router solicitation (RS) message. In some aspects, the RS message may include a registration ownership verifier (ROVR) field. In some cases, the ROVR field may include a cryptographic identifier (crypto ID). In some examples, the crypto ID can be based on the key pair used for initial registration of the IP address prefix. For example, the key pair can be used with a modifier (e.g., sequence counter) to generate one or more crypto IDs.

In some instances, leaf node 208 may respond to the RS message with a router advertisement (RA) message requesting validation of ownership of the IP address prefix. In some aspects, virtual router 204a or virtual router 204b may respond with an RS message that includes a crypto ID parameters option. In some configurations, the RS message may also include a nonce and/or a neighbor discovery protocol signature option (NDPSO). In some cases, the NDPSO may carry the signature that proves ownership of the crypto ID and validates the IP address prefix registration.

In some cases, leaf node 208 may receive the RS message and confirm ownership of the IP address prefix (e.g., based on NDPSO). In some examples, leaf node 208 may communicate with database 210 (e.g., send EDPR and receive EDPC) to re-register the IP address prefix or to retract the IP address prefix. In some instances, leaf node 208 may re-advertise the IP address prefix.

Figure 3:
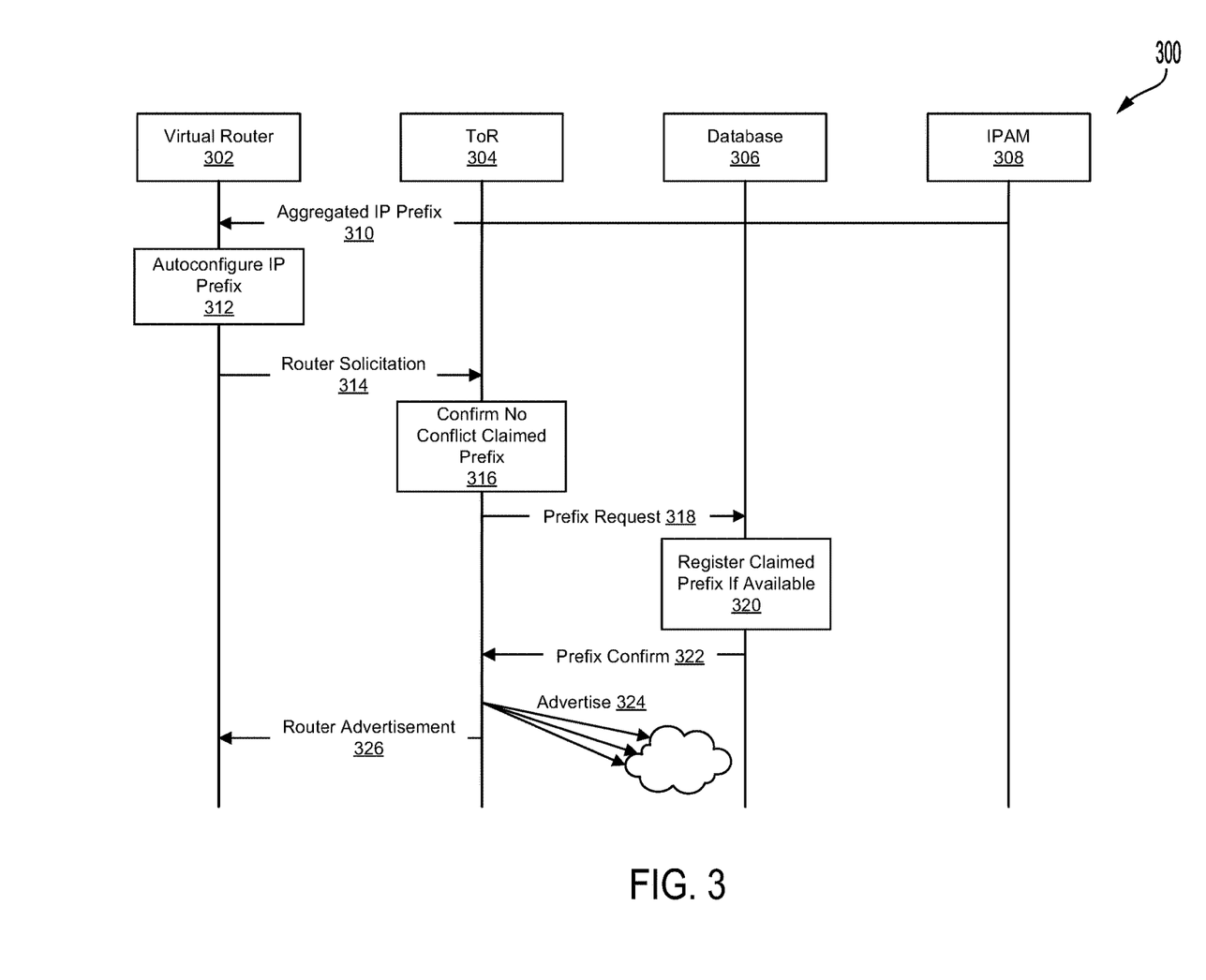
FIG. 3 is a sequence diagram illustrating an example of a sequence for securely advertising autoconfigured prefixes in a cloud environment, in accordance with some examples.

FIG. 3 is a sequence diagram illustrating an example of a sequence 300 for securely advertising autoconfigured prefixes in a cloud environment. The sequence 300 may be performed by virtual router 302, top-of-rack (ToR) switch 304, database 306, and IPAM 308. At action 310, IPAM 308 can send an aggregated IP address prefix to virtual router 302. In some aspects, the IP address prefix may correspond to an IPv6 address prefix. In some cases, the IP address prefix may correspond to an IPv4 address prefix. In some examples, IPAM 308 may send the IP address prefix to virtual router 302 based on a request for an IP address prefix (e.g., dynamic host configuration protocol prefix delegation (DHCP-PD)).

At action 312, virtual router 302 may autoconfigure an IP address prefix. In some cases, virtual router 302 may select an IP address prefix that is within the aggregated IP address prefix received from IPAM 308. In some cases, virtual router 302 may configure the IP address prefix as an atomic prefix such that the prefix may not include any subnets (e.g., no host route within the prefix). In some aspects, virtual router 302 may configure the IP address prefix for IPv4 embedding. In some instances, virtual router 302 may configure the IP address prefix for multihoming a virtual node (not illustrated).

At action 314, virtual router 302 may register the IP address prefix by sending a router solicitation (RS) message to ToR 304. In some cases, the RS message can include a stub registration option (SRO) that indicates the claimed IP address prefix. In some examples, the RS message may include a flag for requesting advertisement of the claimed IP address prefix. In some instances, the RS message may include one or more additional parameters that may be used to indicate whether the claimed IP address prefix is atomic; whether the claimed IP address prefix includes IPv4 embedding; multihoming options; proof of ownership (e.g., key pairs); policy options (e.g., access control list); load balancing option; and/or any other options or parameters.

At action 316, ToR 304 can validate the claimed IP address prefix to ensure there is no conflict with existing routes. If ToR 304 determines that there is a collision based on claimed IP address prefix, ToR 304 may reject the request to register the claimed IP address prefix. If ToR 304 determines that the claimed IP address prefix is within the aggregated IP address prefix from IPAM 308, the registration process may continue. At action 318, ToR 304 can send an Extended Duplicate Prefix Request (EDPR) to database 306. At action 320, database 306 can register the claimed IP address prefix upon determining that it is available (e.g., no conflict with other registered prefixes). For example, database 306 may determine whether the aggregation immediately above the claimed IP address prefix in the registrar is registered as atomic. In some examples, database 306 may deny the request to register the IP address prefix upon determining that another network entity may have claimed aggregation that encompasses the requested IP address prefix for atomic usage. In another example, database 306 may deny the request to register an atomic IP address prefix upon determining that a smaller aggregation or a host route is already registered within the atomic IP address prefix that is requested.

At action 322, database 306 can respond to ToR 304 with an Extended Duplicate Prefix Confirm (EDPC) message. At action 324, ToR 304 can advertise the claimed IP address prefix to a network fabric (e.g., fabric 110). At action 326, ToR 304 can send a RA message to virtual router 302 indicating that the claimed IP address prefix has been registered and advertised to the network fabric.

Figure 4:
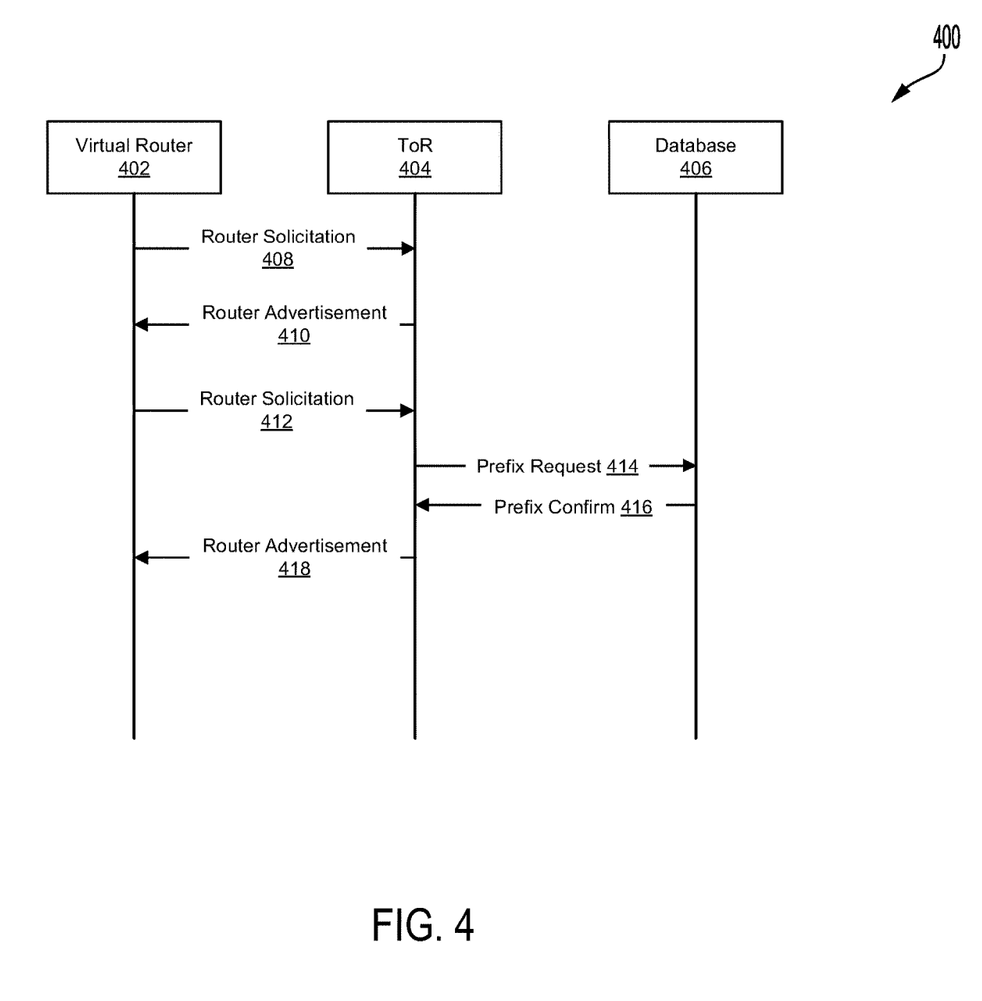
FIG. 4 is a sequence diagram illustrating another example of a sequence for securely advertising autoconfigured prefixes in a cloud environment, in accordance with some examples.

FIG. 4 is a sequence diagram illustrating an example of a sequence 400 for securely advertising autoconfigured prefixes in a cloud environment. The sequence 400 may be performed by virtual router 402, top-of-rack (ToR) switch 404, and database 306. At action 408, virtual router 402 can send a router solicitation (RS) message to ToR 404. In some aspects, the RS message may include a request to re-advertise the claimed IP address prefix. In some cases, the RS message may include a request to retract the claimed IP address prefix.

At action 410, ToR 404 may respond to the RS message by sending a router advertisement (RA) message to virtual router 402. In some cases, the RS message may correspond to a challenge message to confirm ownership of the IP address prefix by virtual router 402. In some examples, the RS message may include an option indicating that validation is requested from virtual router 402.

At action 412, virtual router 402 may send a challenge response message to ToR 404. In some cases, the challenge response may correspond to a RS message that includes a crypto ID parameters option. In some configurations, the RS message may also include a nonce and/or a neighbor discovery protocol signature option (NDPSO). In some cases, the NDPSO may carry the signature that proves ownership of the crypto ID and validates the IP address prefix registration.

In some cases, ToR 404 may receive the RS message and confirm ownership of the IP address prefix (e.g., based on NDPSO). At action 414, ToR 404 may send EDPR message to database 406 (e.g., to re-register the IP address prefix or to retract the IP address prefix). At action 416, database 406 may send EDPC message to ToR 404 indicating completion of the registration or withdrawal of the IP address prefix. At action 418, ToR 404 may send an RA message to virtual router 402 indicating completion of the requested action. In some cases, ToR 404 may re-advertise the IP address prefix (e.g., to a network fabric).

Figure 5:
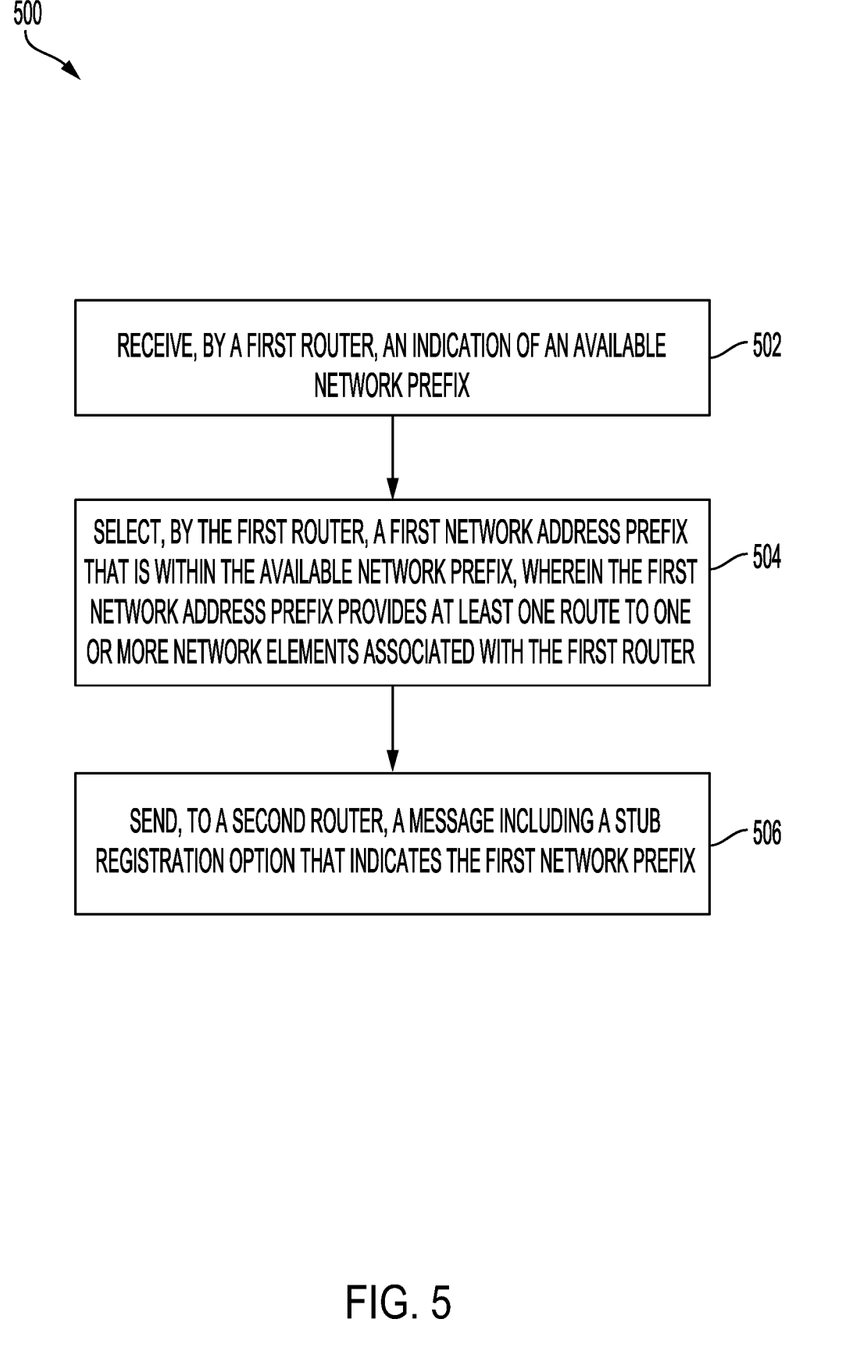
FIG. 5 is a flowchart illustrating an example method for securely advertising autoconfigured prefixes in a cloud environment, in accordance with some examples.

FIG. 5 is a flow diagram illustrating an example of a process 500 for securely advertising autoconfigured prefixes in a cloud environment. At block 502, the process 500 includes receiving, by a first router, an indication of an available network prefix. For example, virtual router 204a can receive an indication of an available IP address prefix from IPAM server 212.

At action 504, the process 500 includes selecting, by the first router, a first network address prefix that is within the available network prefix, wherein the first network address prefix provides at least one route to one or more network elements associated with the first router. For example, virtual router 204a can select a network address prefix (e.g., an IP address prefix) that is within the available IP address prefix received from IPAM server 212. The network address prefix selected by router 204a can be used to provide at least one route to virtual node 202. In some cases, the first router can correspond to a stub router associated with a container network interface (CNI) and the second router can correspond to a border router. For example, virtual router 204a can correspond to a stub router associated with a CNI (e.g., for providing network access to virtual node 202) and leaf node 208 can correspond to a border router (e.g., a top-of-rack (ToR) router or switch).

In some examples, the first network address prefix can correspond to an Internet Protocol version 6 (IPv6) prefix with an embedded Internet Protocol version 4 (IPv4) prefix. For example, virtual router 204a may configure the claimed IP address prefix to include embedded IPv4 addresses (e.g., to implement IPv6 without encapsulation).

At action 506, the process 500 includes sending, to a second router, a message including a stub registration option that indicates the first network prefix. For instance, virtual router 204a can send a router solicitation (RS) message to leaf node 208 that includes a stub registration option indicating the claimed IP address prefix.

In some examples, the message can include an indication that the first network address prefix does not include any subnets. For instance, virtual router 204a can send an RS message to leaf node 208 with a flag or option indicating that the claimed IP address prefix is configured to be atomic.

In some cases, the message can include a request for the second router to inject the at least one route into a network fabric. For example, virtual router 204a can send an RS message to leaf node 208 with a flag for requesting injection of the claimed IP address prefix to network fabric 206.

In some instances, the message can include an indication that the first network address prefix is multi-homed, and wherein the at least one route includes a plurality of routes. For instance, virtual router 204a may send an RS message to leaf node 208 with an indication that the claimed IP address prefix is multihomed (e.g., virtual node 202 is multihomed with virtual router 204a and virtual router 204b). In some aspects, the RS message can associate a first portion of the claimed IP address prefix with virtual router 204a and a second portion of the claimed IP address prefix with virtual router 204b. In some examples, leaf node 208 may inject routes to fabric 206 corresponding to the respective virtual routers.

In some configurations, the message can include at least one of a load balancing parameter, an ownership parameter, an address control list (ACL) parameter, and a virtual routing and forwarding (VRF) parameter. For example, virtual router 204a can send an RS message to leaf node 208 that includes a load balancing parameter (e.g., interface preference), an ownership parameter (e.g., key pair), an ACL parameter, and/or a VRF parameter.

In some aspects, the method 500 can include receiving, from the second router, an indication that the first network address prefix is not available and in response, selecting a second network address prefix that is within the available network address prefix. For example, leaf node 208 may reject the request to register the claimed IP address prefix upon determining that the claimed IP address prefix is outside of the available IP address prefix identified by IPAM server 212. In some aspects, virtual router 204a may select a new IP address prefix from the available IP address prefix provided by IPAM server 212.

Figure 6:
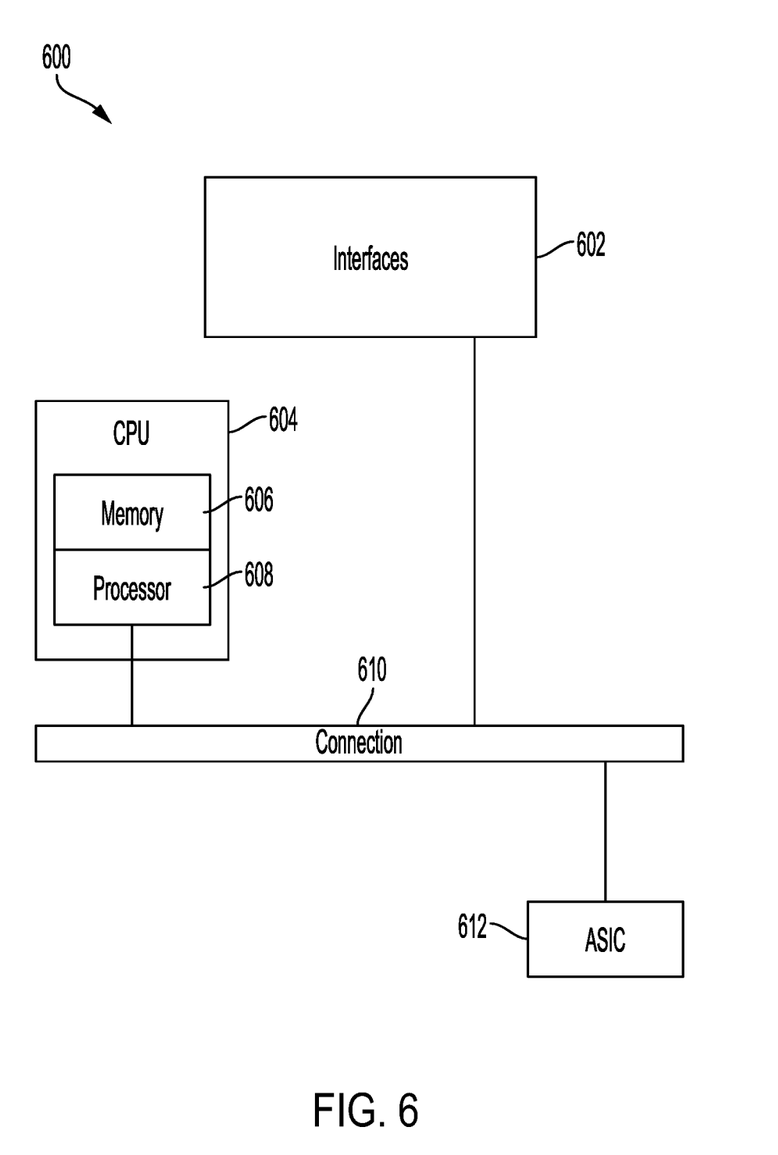
FIG. 6 illustrates an example network device, in accordance with some examples.
Figure 7:
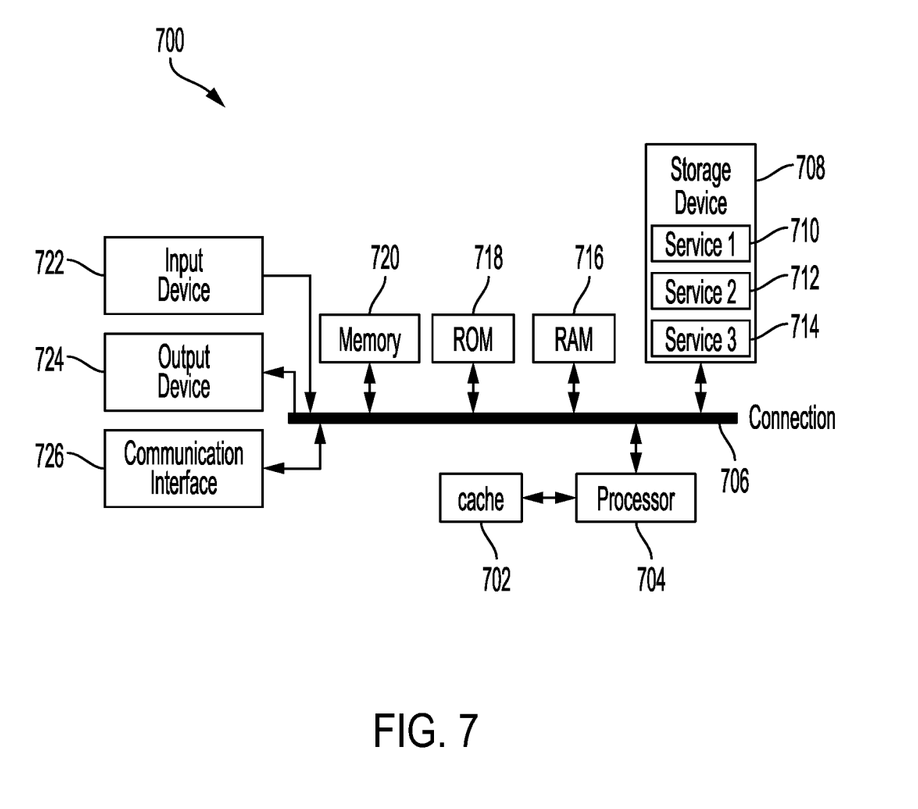
FIG. 7 illustrates an example computing device, in accordance with some examples.

The disclosure now turns to FIGS. 6 and 7, which illustrate example network devices and computing devices, such as switches, routers, nodes, servers, client devices, orchestrators, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HS SI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU (e.g., 604) to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates an example computing system architecture of a system 700 which can be used to process FaaS operations and requests, deploying execution environments, loading code associated with FaaS functions, and perform any other computing operations described herein. In this example, the components of the system 700 are in electrical communication with each other using a connection 706, such as a bus. The system 700 includes a processing unit (CPU or processor) 704 and a connection 706 that couples various system components including a memory 720, such as read only memory (ROM) 718 and random access memory (RAM) 716, to the processor 704.

The system 700 can include a cache of high-speed memory connected directly with, in close proximity to, or integrated as part of the processor 704. The system 700 can copy data from the memory 720 and/or the storage device 708 to cache 702 for quick access by the processor 704. In this way, the cache can provide a performance boost that avoids processor 704 delays while waiting for data. These and other modules can control or be configured to control the processor 704 to perform various actions. Other memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

The storage device 708 can include services 710, 712, 714 for controlling the processor 704. Other hardware or software modules are contemplated. The storage device 708 can be connected to the connection 706. In one aspect, a hardware module that performs a particular function can include the software component stored in a computer-readable medium in connection with the necessary hardware components, such as the processor 704, connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    receiving, by a first router, an indication of an available network address prefix;
    autoconfiguring, by the first router, a first network address prefix that is within the available network address prefix, wherein the first network address prefix provides at least one route to one or more network elements associated with the first router; and
    sending, to a second router, a router solicitation message including a stub registration option identifying the first network address prefix as one of an atomic, a multi-homed, or an embedded network address prefix.

2. The method of claim 1, wherein the first router corresponds to a stub router associated with a container network interface (CNI) and wherein the second router corresponds to a border router.

3. The method of claim 1, further comprising:
    receiving, from the second router, an indication that the first network address prefix cannot be used; and
    in response, selecting a second network address prefix that is within the available network address prefix.

4. The method of claim 1, wherein the first network address prefix corresponds to an Internet Protocol version 6 (IPv6) prefix with an embedded Internet Protocol version 4 (IPv4) prefix.

5. The method of claim 1, wherein the stub registration option includes a request for the second router to inject the at least one route into a network fabric.

6. The method of claim 1, wherein the stub registration option includes an indication that the first network address prefix is multi-homed, and wherein the at least one route includes a plurality of routes.

7. The method of claim 1, wherein the one or more parameters stub registration option includes at least one of a load balancing parameter, an ownership parameter, an address control list (ACL) parameter, and a virtual routing and forwarding (VRF) parameter.

8. An apparatus comprising:
    one or more processors; and
    at least one computer-readable storage medium having stored thereon instructions which, when executed by the one or more processors, cause the one or more processors to:
        receive an indication of an available network address prefix;
        autoconfigure a first network address prefix that is within the available network address prefix, wherein the first network address prefix provides at least one route to one or more network elements associated with the apparatus; and
        send, to a router, a router solicitation message including a stub registration option identifying the first network address prefix as one of an atomic, a multi-homed, or an embedded network address prefix.

9. The apparatus of claim 8, wherein the apparatus corresponds to a stub router associated with a container network interface (CNI) and wherein the router corresponds to a border router.

10. The apparatus of claim 8, the at least one computer-readable storage medium storing instructions which, when executed by the one or more processors, cause the apparatus to:
    receive, from the router, an indication that the first network address prefix cannot be used; and
    in response, selecting a second network address prefix that is within the available network address prefix.

11. The apparatus of claim 8, wherein the first network address prefix corresponds to an Internet Protocol version 6 (IPv6) prefix with an embedded Internet Protocol version 4 (IPv4) prefix.

12. The apparatus of claim 8, wherein the stub registration option includes a request for the router to inject the at least one route into a network fabric.

13. The apparatus of claim 8, wherein the stub registration option includes an indication that the first network address prefix is multi-homed, and wherein the at least one route includes a plurality of routes.

14. The apparatus of claim 8, wherein the message includes at least one of a load balancing parameter, an ownership parameter, an address control list (ACL) parameter, and a virtual routing and forwarding (VRF) parameter.

15. A non-transitory computer-readable storage medium having stored thereon instructions which, when executed by one or more processors, cause the one or more processors to:
    receive, by a first router, an indication of an available network address prefix;
    autoconfigure a first network address prefix that is within the available network address prefix, wherein the first network address prefix provides at least one route to one or more network elements associated with the first router; and
    send, to a second router, a router solicitation message including a stub registration option identifying the first network address prefix as one of an atomic, a multi-homed, or an embedded network address prefix.

16. The non-transitory computer-readable storage medium of claim 15, comprising instructions which, when executed by one or more processors, cause the one or more processors to:
    receive, from the second router, an indication that the first network address prefix is not available; and in response, selecting a second network address prefix that is within the available network address prefix.

17. The non-transitory computer-readable storage medium of claim 15, wherein the first network address prefix corresponds to an Internet Protocol version 6 (IPv6) prefix with an embedded Internet Protocol version 4 (IPv4) prefix.

18. The non-transitory computer-readable storage medium of claim 17, wherein the one or more parameters include a request for the second router to inject the at least one route into a network fabric.

* * * * *